US010553323B2

United States Patent
Han et al.

(10) Patent No.: US 10,553,323 B2
(45) Date of Patent: Feb. 4, 2020

(54) FUEL BALL DETECTING METHOD AND SYSTEM WITH SELF-DIAGNOSIS FUNCTION

(71) Applicant: Tsinghua University, Beijing (CN)

(72) Inventors: Zandong Han, Beijing (CN); Haiquan Zhang, Beijing (CN); Dong Du, Beijing (CN); Xiaoyang Li, Beijing (CN); Haipeng Zhou, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 558 days.

(21) Appl. No.: 15/110,098

(22) PCT Filed: Apr. 21, 2014

(86) PCT No.: PCT/CN2014/075763
§ 371 (c)(1),
(2) Date: Jul. 6, 2016

(87) PCT Pub. No.: WO2015/113327
PCT Pub. Date: Aug. 6, 2015

(65) Prior Publication Data
US 2016/0329115 A1    Nov. 10, 2016

(30) Foreign Application Priority Data
Jan. 29, 2014 (CN) .......................... 2014 1 0043818

(51) Int. Cl.
*G21C 17/06* (2006.01)
*G21C 19/20* (2006.01)
*G21C 17/10* (2006.01)

(52) U.S. Cl.
CPC ........... *G21C 17/06* (2013.01); *G21C 17/102* (2013.01); *G21C 19/202* (2013.01)

(58) Field of Classification Search
CPC ........ G21C 1/07; G21C 17/06; G21C 17/066; G21C 17/102; G21C 19/202; Y02E 30/36
See application file for complete search history.

(56) References Cited

U.S. PATENT DOCUMENTS 4,424,187 A  *  1/1984  Thyssen ................... G01V 3/02
                                                                376/245

FOREIGN PATENT DOCUMENTS

CN        1103504 A       6/1995
CN        1819065 A       8/2006
(Continued)

OTHER PUBLICATIONS

English machine translation of "Two-way fuel ball counter circuit for sphere high temperature gas-cooling reactor", by Li et al. (CN-100483458-C); published Apr. 29, 2009 (Year: 2009).*
(Continued)

*Primary Examiner* — David M. Gray
*Assistant Examiner* — Geoffrey T Evans
(74) *Attorney, Agent, or Firm* — Houtteman Law LLC

(57) ABSTRACT

A fuel ball detecting method and system with a self-diagnosis function are provided. The method includes: exciting a first detecting coil and a second detecting coil of a fuel ball sensor disposed outside a pipeline; obtaining a first voltage signal $U_1$ from the first detecting coil and a second voltage signal $U_2$ from the second detecting coil; processing $U_1$ and $U_2$ by differential amplification, band pass filtering, phase sensitive detection and low pass filtering by a signal processor to obtain a fuel ball waveform signal $U_0$; determining whether the fuel ball passes the pipeline according to $U_0$ by a single chip microcomputer; determining whether the first and the second detecting coils, the signal processor and the single chip microcomputer work normally; outputting a result showing whether the fuel ball passes the pipeline, when the first and the second detecting coils, the signal processor and the single chip microcomputer work normally.

16 Claims, 7 Drawing Sheets

(56) References Cited

FOREIGN PATENT DOCUMENTS

| CN | 1866278 | A | * | 11/2006 | | |
|---|---|---|---|---|---|---|
| CN | 101174483 | A | * | 5/2008 | | |
| CN | 101202126 | A | * | 6/2008 | | |
| CN | 100483458 | C | * | 4/2009 | | |
| CN | 101719387 | A | | 6/2010 | | |
| CN | 201717117 | U | | 1/2011 | | |
| DE | 2654410 | A1 | * | 6/1978 | ........... | G21C 17/066 |
| JP | 2012202984 | A | | 10/2012 | | |
| WO | WO-02095766 | A1 | * | 11/2002 | ........... | G21C 17/066 |

OTHER PUBLICATIONS

English machine translation of "Fuel ball bidirectional ball-passing test device of butt assembly type ball bed high temperature gas-cooled reactor", by Li et al. (CN-101174483-A); published May 7, 2008 (Year: 2008).*

English machine translation of "Bidirectional ball-passing count and display device for ball bed high temperature gas-cooling stack ball-passing loading/unloading system", by Wang et al. (CN-101202126-A); published Jun. 18, 2008 (Year: 2008).*

English machine translation of "External ball passage detecting method and device for ball-bed high temperature gas cooled reactor", by Zhang et al. (CN-101719387-A); published Jun. 2, 2010 (Year: 2010).*

Parameter optimization of detecting coil design for fuel ball counter in high temperature gas-cool reactor; by Zhang Liang,Han Zandong (Year: 2010).*

English translation of "Parameter optimization of detecting coil design for fuel ball counter in high temperature gas-cool reactor" by Zhang Liang,Han Zandong (Year: 2010).*

Japan Patent Office, Office action issued for JP application 2015559417, which is a Japan counterpart application of the present application.

China Patent Office, Office action dated Sep. 18, 2015 for CN application 201410043818.1.

WIPO, English translation of international search report and written opinions for PCT application CN2014075763.

* cited by examiner

FUEL BALL DETECTING METHOD AND SYSTEM WITH SELF-DIAGNOSIS FUNCTION

CROSS REFERENCE TO RELATED APPLICATION

This U.S. application claims priority under 35 U.S.C 371 to, and is a U.S. National Phase application of, the International Patent Application No. PCT/CN2014/075763, filed Apr. 21, 2014, which claims the benefit of prior Chinese Application No. 201410043818.1 filed Jan. 29, 2014. The entire contents of the before-mentioned patent applications are incorporated by reference as part of the disclosure of this U.S. application.

FIELD

Embodiments of the present disclosure generally relate to a detecting technology field, and more particularly, to a fuel ball detecting method and system with a self-diagnosis function.

BACKGROUND

Secure and efficient nuclear reactor is one of the key technologies to solve the energy resource shortage problems. Since the pebble-bed high temperature gas cooled reactor has a high power generation efficiency and a good inherent safety, and the fuel can be loaded and unloaded without turning off the reactor, it is very popular in many countries.

Presently, the principle of a fuel component detecting device applied in the pebble-bed reactor is detecting the fuel component based on effects of a graphite conductor on the inductive reactance of the coil, and the detecting device can be divided into the following categories according to different structures. The first category is the inboard detecting device in which the detecting coil is predisposed in the stainless steel fuel ball pipeline and when the fuel ball passes through the detecting coil, the inductive reactance of the coil changes, and a fuel ball signal can be obtained by detecting the inductive reactance changes of the coil. The second category is the detecting device installed via side wall drillings in which a hole is formed in the side wall of the stainless steel fuel ball pipeline and the detecting coil is disposed in the hole. The second category device is similar to the electromagnetic proximity switch.

Since the installation of the above two devices both may influence the gas tightness of the pipeline, the sensor structure and the installation have to ensure a gas tightness of the ball pipeline under a high pressure, resulting in the structure complication and mounting difficulty of the sensor. When a fault occurs in the sensor, in order to maintain and replace the sensor, the fuel ball pipeline is needed to be dismantled, which has a long construction time and easily causes radiation pollution, thus influencing utilizability of the reactor. Furthermore, the detecting coil, the frames and other attachments contact with the radioactivity fuel ball directly, which affects a working life of the sensor, so the anti-radiation capability of the sensor material is required to be good.

In addition, the high temperature gas cooled reactor has various electromagnetic interferences and heavy nuclear radiation, and the working environment of the reactor is so complex that it's difficult to check and maintain the devices. The conventional detecting devices have the following defects: the fuel ball detecting device has a low electromagnetic compatibility and is easy to be interfered by an electromagnetic environment in the high temperature gas cooled reactor, thus resulting in a miscount; when a fault occurs in the fuel ball detecting device, the detecting device cannot generate an alarm initiatively, such that a counting loss and a miscount may occur during the failure period.

SUMMARY

Embodiments of the present disclosure seek to solve at least one of the problems existing in the prior art to at least some extent, such as damages on a fuel ball pipeline, a poor anti-interference capability and no initiative alarms during a failure period.

Accordingly, a first objective of the present disclosure is to provide a fuel ball detecting method with a self-diagnosis function.

A second objective of the present disclosure is to provide a fuel ball detecting system with a self-diagnosis function.

In order to achieve above objectives, according to embodiments of a first broad aspect of the present disclosure, a fuel ball detecting method with a self-diagnosis function is provided, including: exciting a first detecting coil and a second detecting coil of a fuel ball sensor disposed outside a pipeline by a sinusoidal alternating current, wherein the first detecting coil and the second detecting coil wind around the pipeline and are set upstream and downstream the pipeline respectively; obtaining a first voltage signal $U_1$ from the first detecting coil and a second voltage signal $U_2$ from the second detecting coil; processing the first voltage signal $U_1$ and the second voltage signal $U_2$ by differential amplification, band pass filtering, phase sensitive detection and low pass filtering by a signal processor so as to obtain a fuel ball waveform signal $U_0$; determining whether the fuel ball passes the pipeline according to $U_0$ by a single chip microcomputer; determining whether the first detecting coil, the second detecting coil, the signal processor and the single chip microcomputer work normally; and outputting a result showing whether the fuel ball passes the pipeline, when the first detecting coil, the second detecting coil, the signal processor and the single chip microcomputer work normally.

According to embodiments of the present disclosure, the fuel ball detecting method with a self-diagnosis function has at least the following advantages: a self-diagnosis function is added; when a fault occurs in at least one of the first and the second detecting coils, the signal processor and the single chip microcomputer, an alarm can be generated for the fault to be removed in time, which avoids the counting loss and improves reliability of a fuel ball counting result.

According to embodiments of a second broad aspect of the present disclosure, a fuel ball detecting system with a self-diagnosis function is provided, including: a fuel ball sensor disposed outside a pipeline and comprising a first detecting coil and a second detecting coil winding around the pipeline and set upstream and downstream the pipeline respectively; an exciting module configured to generate a sinusoidal alternating current exciting signal to excite the first detecting coil and the second detecting coil; a resonance bridge detecting circuit configured to obtain a first voltage signal $U_1$ from the first detecting coil and a second voltage signal $U_2$ from the second detecting coil; a signal processor connected with the resonance bridge detecting circuit and configured to process the first voltage signal $U_1$ and the second voltage signal $U_2$ by differential amplification, band pass filtering, phase sensitive detection and low pass filtering, so as to obtain a fuel ball waveform signal $U_0$; a single chip microcomputer connected with the signal processor and configured to determine whether the fuel ball passes the pipeline according to the $U_0$; a self-diagnosis module connected with the first detecting coil, the second detecting coil, the signal processor and the single chip microcomputer and configured to detect whether the first detecting coil, the second detecting coil, the signal processor and the single chip microcomputer work normally; and an outputting module connected with the single chip microcomputer and the self-diagnosis module respectively and configured to output a result showing whether the fuel ball passes the pipeline, when the first detecting coil, the second detecting coil, the signal processor and the single chip microcomputer work normally.

According to embodiments of the present disclosure, the fuel ball detecting system with a self-diagnosis function has at least the following advantages: a self-diagnosis function is added, and when a fault occurs in at least one of the first and the second detecting coils, the signal processor and the single chip microcomputer, an alarm can be generated for the fault to be removed in time, which avoids the counting loss and improves reliability of a fuel ball counting result.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
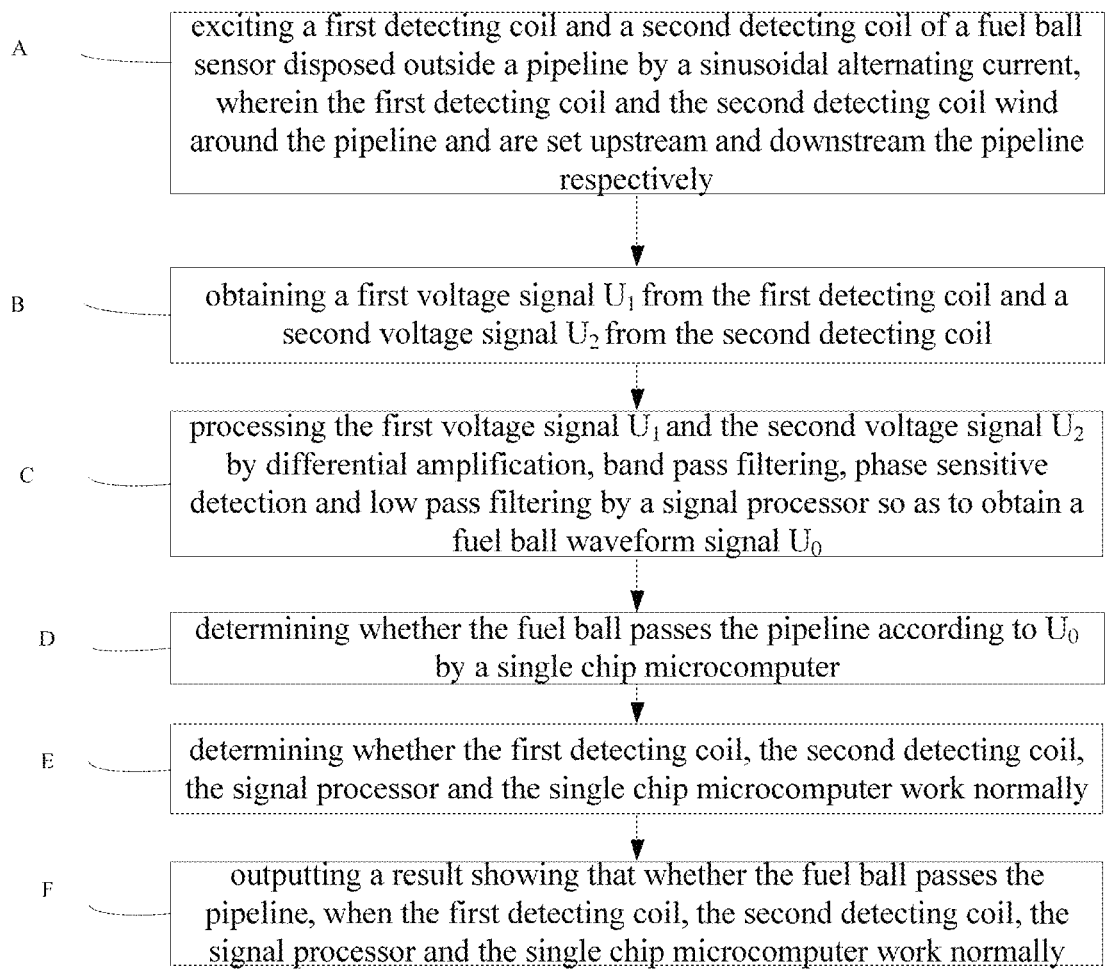
FIG. 1 is a flow chart showing a fuel ball detecting method with a self-diagnosis function according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "length", "width", "thickness", "front", "rear", "left", "right", "lower", "upper", "horizontal", "vertical", "above", "below", "up", "down", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two elements. Those having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer. The storage medium mentioned above may be read-only memories, magnetic disks or CD, etc.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The present disclosure seeks to provide a fuel ball detecting method with a self-diagnosis function and a system for detecting and counting a graphite-based fuel ball in a loading pipeline, an unloading pipeline and a spent fuel pipeline, which has a great anti-interference capability and a high reliability. When a fault occurs in key devices in the detecting system, the fault can be detected and an alarm can be generated so as to avoid a miscount of the fuel ball. The detecting method and system can work reliably and detect the fuel ball accurately in atrocious electromagnetic environments, such that loading and unloading the fuel ball in various environments can be controlled effectively, thus ensuring a safe operation of a reactor.

As shown in FIG. 1, the fuel ball detecting method with a self-diagnosis function according to embodiments of the present disclosure includes the following steps.

In step A, a first detecting coil and a second detecting coil of a fuel ball sensor are excited by a sinusoidal alternating current, in which the fuel ball sensor is disposed outside a pipeline, and the first detecting coil and the second detecting coil wind around the pipeline and are set upstream and downstream the pipeline respectively. The first and second detecting coils are disposed at different locations of the pipeline, so as to ensure a time difference between time of the fuel ball passing through the first detecting coil and that of the second detecting coil.

The sinusoidal alternating current is recorded as $U_E$. The sinusoidal alternating current may be based on direct digital frequency synthesis technology and an AD9850 chip is used to full-digitally synthesize the sinusoidal alternating current having a stable amplitude and frequency, and then the sinusoidal alternating current is amplified by a LM1875 power chip and further input into the first detecting coil and the second detecting coil.

Figure 2A:
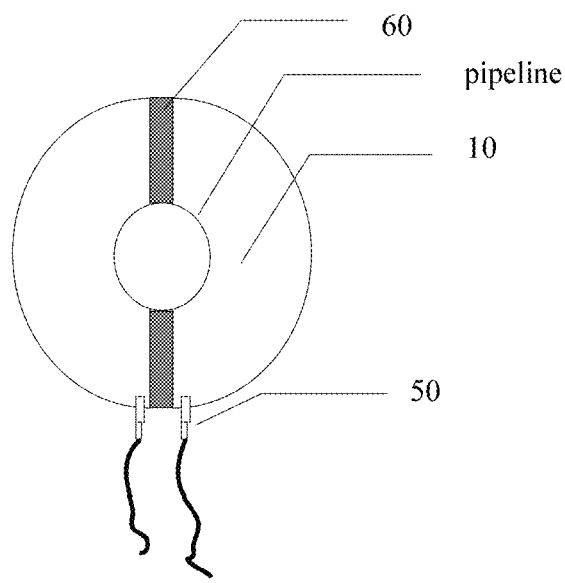
FIG. 2(a) is schematic diagram of an outer part of the fuel ball sensor according to an embodiment of the present disclosure, and FIG. 2 (b) is a schematic diagram of an inner part of the fuel ball sensor according to an embodiment of the present disclosure.
Figure 2B:
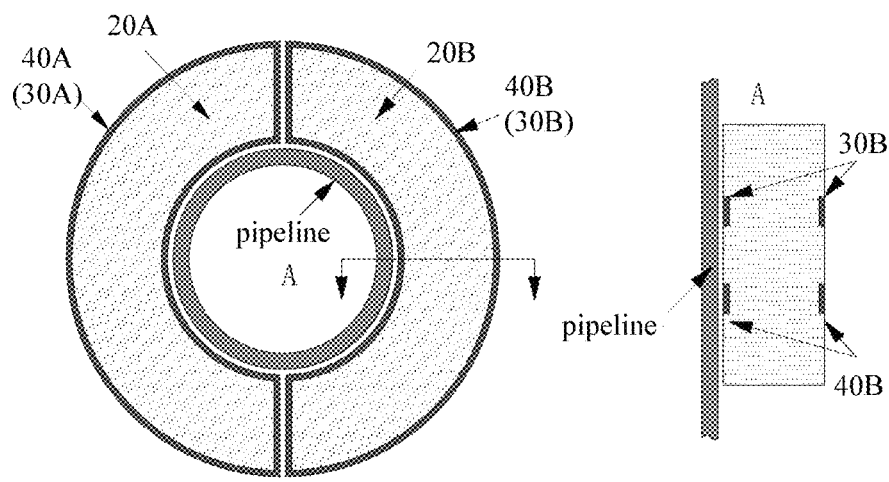

An outer structure of the fuel ball sensor is shown in FIG. 2 (a) and an inner structure of the fuel ball sensor is shown in FIG. 2 (b). The fuel ball sensor includes: a housing 10; a pair of semi-ring frames 20A and 20B, the first detecting coil 30 and the second detecting coil 40, an aviation plug or a feed-through filter 50 and an electromagnetic sealing gasket 60. The pair of semi-ring frames 20A and 20B disposed over the pipeline fitted with each other. The first detecting coil 30 and the second detecting coil 40 respectively comprise a pair of semi-ring coils 30A, 30B and 40A, 40B connected with each other and winding around the pair of semi-ring frames, in which a wire rod, a winding method and a coil turn of each coil are the same with each other. The aviation plug or the feed-through filter 50 is connected with an output terminal of the first detecting coil 30 and the second detecting coil 40, so as to improve the anti-interference of the system. The electromagnetic sealing gasket 60 fills in a gap between the semi-ring coils and contacts with the housing 10, thus achieving a good shielding.

The detecting coils in the above fuel ball sensor is designed as two semi-ring coils fitted with each other, which satisfies an external installation requirement and facilitates installation and maintenance. The coil has a narrow and flat shape, which can ensure a detecting sensitivity. In one embodiment, the coils are winded with two wires respectively so as to ensure a resistance deviation and an inductance deviation between the first detecting coil and the second detecting coil are less than 1%. The pair of semi-ring frames may be made of polysulfone plastics and the wire of the coils may be a polyimide varnished wire, so as to satisfy operating requirements for particular environments such as withstanding high temperatures and anti-radiation. The housing 10 itself has a good electromagnet isolation performance. However, radiation still can interfere and further be coupled to the coil in the fuel ball sensor through the gap in the housing 10 formed during the installation, and thus a shielding process is required. Therefore, the electromagnetic sealing gasket 60 is adapted to fill in the gap between the semi-ring coils and contact with the housing 10, so as to achieve a complete shielding structure.

In step B, a first voltage signal $U_1$ is obtained from the first detecting coil and a second voltage signal $U_2$ is obtained from the second detecting coil by a resonance bridge detecting circuit.

Figure 3:
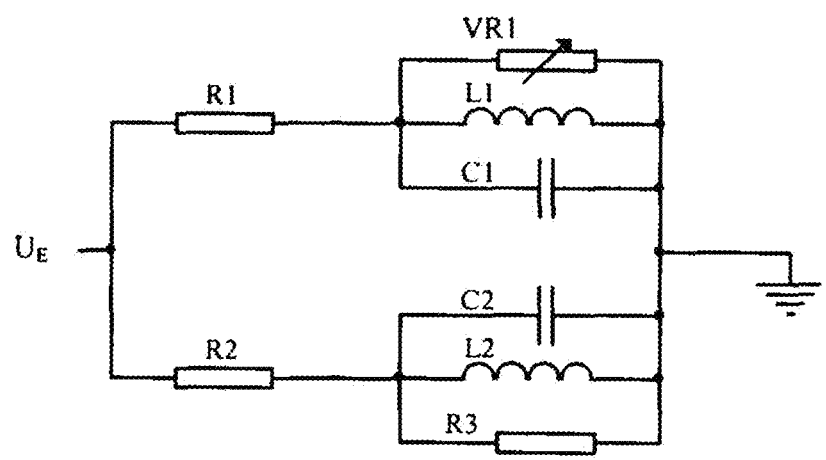
FIG. 3 is a circuit diagram showing a resonance bridge detecting circuit according to an embodiment of the present disclosure.

FIG. 3 is a circuit diagram showing a resonance bridge detecting circuit according to an embodiment of the present disclosure. As shown in FIG. 3, a first resistor R1 represents a first bridge arm and has a terminal connected with an output terminal of the exciting module to receive the exciting signal $U_E$; a second resistor R2 represents a second bridge arm and has a terminal connected with the output terminal of the exciting module to receive the exciting signal $U_E$; the first detecting coil L1, a first capacitor C1 and a potentiometer VR1 connected in parallel with each other represent a third bridge arm, in which a first terminal of the third bridge arm is grounded and a second terminal of the third bridge arm is configured to output the first voltage signal $U_1$; the second detecting coil L2, a second capacitor C2 and a third resistor R3 connected in parallel with each other represent a fourth bridge arm, in which a first terminal of the fourth bridge is grounded and a second terminal of the fourth bridge arm is configured to output the second voltage signal $U_2$.

In step C, the first voltage signal $U_1$ and the second voltage signal $U_2$ are processed by differential amplification, band pass filtering, phase sensitive detection and low pass filtering by a signal processor so as to obtain a fuel ball waveform signal $U_0$.

Figure 4:
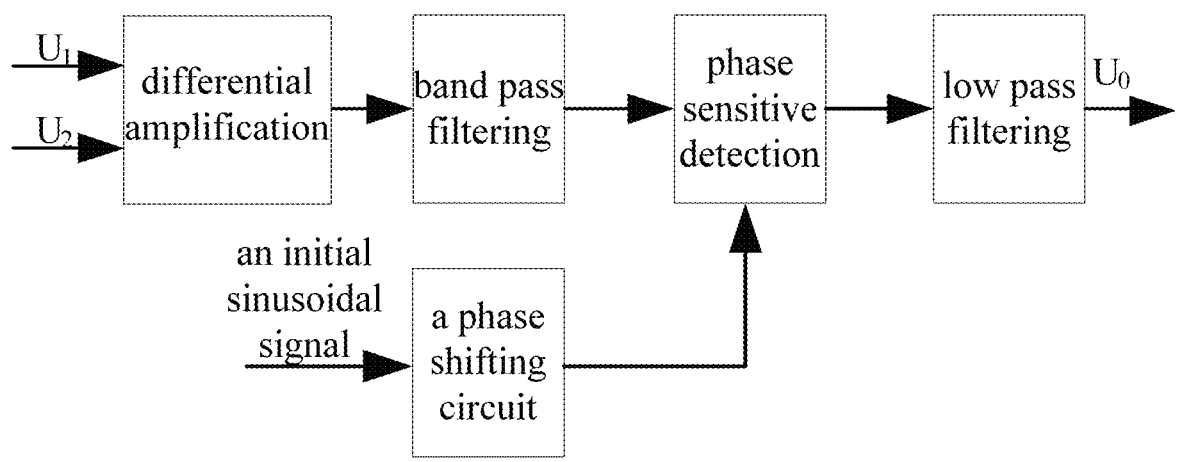
FIG. 4 is a schematic diagram showing a signal processor according to an embodiment of the present disclosure.

Specifically, the processor obtains the fuel ball waveform signal $U_0$ according to a lock-in amplification principle, as shown in FIG. 4. The first voltage signal $U_1$ and the second voltage signal $U_2$ are processed by a differential amplification circuit, a band pass filtering circuit, a phase sensitive detection circuit and a low pass filtering circuit sequentially. The initial sinusoidal signal is processed by a phase shifted circuit and a phase shifted initial sinusoidal signal is obtained. In the phase sensitive detection circuit, the first voltage signal $U_1$ and the second voltage signal $U_2$ are multiplied by the phase shifted initial sinusoidal signal. After being processed by the low pass filtering circuit the fuel ball waveform signal $U_0$ is outputted, which can indicate changes of the first voltage signal $U_1$ and the second voltage signal $U_2$.

Figure 5:
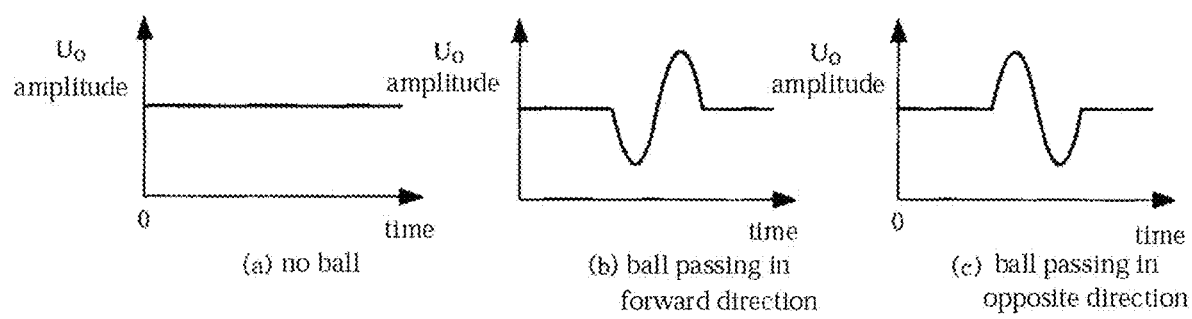
FIG. 5 is a waveform diagram showing a fuel ball waveform signal $U_0$ according to an embodiment of the present disclosure.

A waveform of the fuel ball waveform signal $U_0$ is shown in FIG. 5. When no ball passes the pipeline, excited by the sinusoidal alternating current, the first detecting coil generates the voltage signal $U_1$ and the second detecting coil generates the voltage signal $U_2$ due to the mutual inductance between the first detecting coil and the second detecting coil, in which the voltage signals $U_1$ and $U_2$ have a same frequency, a same phase position and an equal amplitude, and the fuel ball waveform signal $U_0$ is constant. When the fuel ball passes the pipeline, an inductive reactance of the first detecting coil and that of the second detecting coils change due to an eddy current effect. The fuel ball passes through the first detecting coil and the second detecting coil at different time, so the amplitudes and phases of the voltage signals $U_1$ and $U_2$ change, excited by the sinusoidal alternating current. The fuel ball waveform signal $U_0$ obtained by the resonance bridge detecting circuit is an approximate sinusoidal alternating signal.

In step D, it is determined whether the fuel ball passes the pipeline according to $U_0$ by a single chip microcomputer.

(1) It is determined whether the fuel ball waveform signal $U_0$ is complete.

Specifically, the fuel ball waveform signal $U_0$ is processed by a dual threshold comparison to generate adjacent pulses, and then it is determined whether the adjacent pulses comprise a peak pulse $U_{P1}$ and a valley pulse $U_{P2}$; if yes, it is determined the fuel ball waveform signal $U_0$ is complete; and if no, it is determined the fuel ball waveform signal $U_0$ is incomplete.

(2) It is determined whether the fuel ball waveform signal $U_0$ is continuous.

Specifically, it is determined whether a time difference between a falling edge of the peak pulse $U_{P1}$ and a rising edge of the valley pulse $U_{P2}$ of the fuel ball waveform signal $U_0$ adjacent to each other is less than a peak pulse width or a valley pulse width; if yes, it is determined the fuel ball waveform signal $U_0$ is continuous; and if no, it is determined the fuel ball waveform signal $U_0$ is discontinuous. The peak pulse width is determined by a peak amplitude threshold $U_{Th1}$ of the fuel ball waveform signal $U_0$ and the valley pulse width is determined by a valley amplitude threshold $U_{Th2}$ of the fuel ball waveform signal $U_0$.

$$U_{Th1} = \text{(a base value of } U_0 \text{ without the fuel ball+a peak value of } U_0 \text{ with the fuel ball)}/2$$

$$U_{Th2} = \text{(a base value of } U_0 \text{ without the fuel ball+a valley value of } U_0 \text{ with the fuel ball)}/2$$

The base value of $U_0$ without the fuel ball is a preset value.

(3) It is determined whether the fuel ball waveform signal $U_0$ is symmetrical.

Specifically, it is determined whether waveform widths of the peak pulse $U_{P1}$ and the valley pulse $U_{P2}$ of $U_0$ are similar to each other; if yes, it is determined the fuel ball waveform signal $U_0$ is symmetrical; and if no, it is determined the fuel ball waveform signal $U_0$ is dissymmetrical. For example, when a difference between the peak pulse width and the valley pulse width is less than or equal to 25%, it is determined the fuel ball waveform signal $U_0$ is symmetrical.

(4) It is determined the fuel ball passes the pipeline when the fuel ball waveform signal $U_0$ is complete, continuous and symmetrical.

In step E, it is determined whether the first detecting coil, the second detecting coil, the signal processor and the single chip microcomputer work normally.

Figure 6:
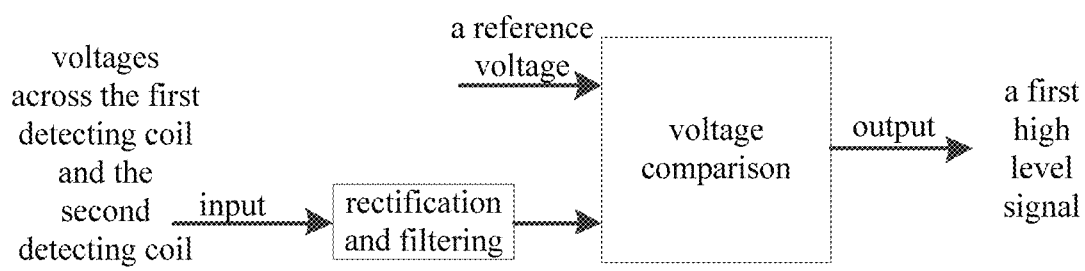
FIG. 6 is a schematic diagram illustrating a principle of detecting a working state of first and second detecting coils according to an embodiment of the present disclosure.

(1) It is determined whether the first detecting coil and the second detecting coil work normally by detecting voltages across the first detecting coil and the second detecting coil, and a first high level signal is output, when the first detecting coil and the second detecting coil work normally. Specifically, when the first and the second detecting coils work normally, the voltages across the first and the second detecting coils are high due to resonance phenomenon; when a fault (no matter a short circuit or a broken circuit) occurs in the first detecting coil or the second detecting coil, the voltage across the first detecting coil or the second detecting coil decreases, and thus the first high level signal output from a resonance detecting circuit is turned into a low level, of which a principle is shown in FIG. 6.

Figure 7:
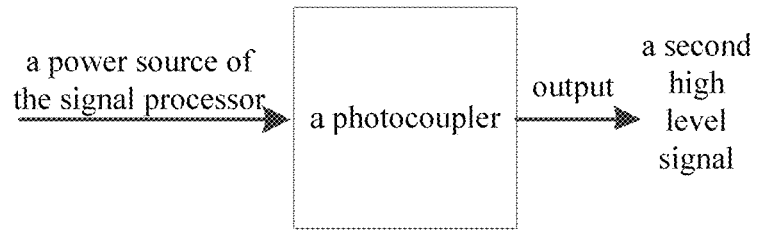
FIG. 7 is a schematic diagram illustrating a principle of detecting a working state of a signal processor according to an embodiment of the present disclosure.

(2) It is determined whether the signal processor works normally via a photocoupler disposed on a power source terminal of the signal processor, and a second high level signal is output when the signal processor works normally. Specifically, the photocoupler is disposed on the power source terminal of the signal processor to detect the signal processor. When a fault occurs, a signal output from the photocoupler turns into a low level instead of a high level, of which a principle is shown in FIG. 7.

(3) It is determined whether the single chip microcomputer works normally by detecting a square wave output from the single chip microcomputer, and a third high level signal is output when the single chip microcomputer works normally.

(4) The first high level signal, the second high level signal and the third high level signal are processed by AND operation to get a self-diagnosis output signal.

(5) It is determined that the first detecting coil, the second detecting coil, the signal processor and the single chip microcomputer work normally when the self-diagnosis output signal is a high level signal.

In step F, a result showing whether the fuel ball passes the pipeline is output, when the first detecting coil, the second detecting coil, the signal processor and the single chip microcomputer work normally.

In addition, in an embodiment of the present disclosure, the fuel ball detecting method with a self-diagnosis function further includes step G in which an alarm is output when the self-diagnosis output signal is a low level signal, which means that at least one of the first detecting coil, the second detecting coil, the signal processor and the single chip microcomputer work abnormally.

According to embodiments of the present disclosure, the fuel ball detecting method with a self-diagnosis function has at least following advantages: semi-ring coils fitted with each other are used as the outboard sensor, which makes the structure of the sensor simple; it's not necessary to destroy the pipeline during installation and maintenance, thus ensuring the completeness and gas tightness of the pipeline under a high pressure and reducing the radiation pollution; by providing a reasonable exciting signal and processing the fuel ball waveform signal $U_0$, a good signal to noise ratio can be obtained and the system gain can be reduced; the first and the second detecting coils are designed with an electromagnetic compatibility, which improves the anti-interference capability; a self-diagnosis function is added and when a fault occurs in at least one of the first and the second detecting coils, the signal processor and the single chip microcomputer, an alarm can be generated for the fault to be removed in time, which avoids the counting loss and improves the reliability of a fuel ball counting result.

Figure 8:
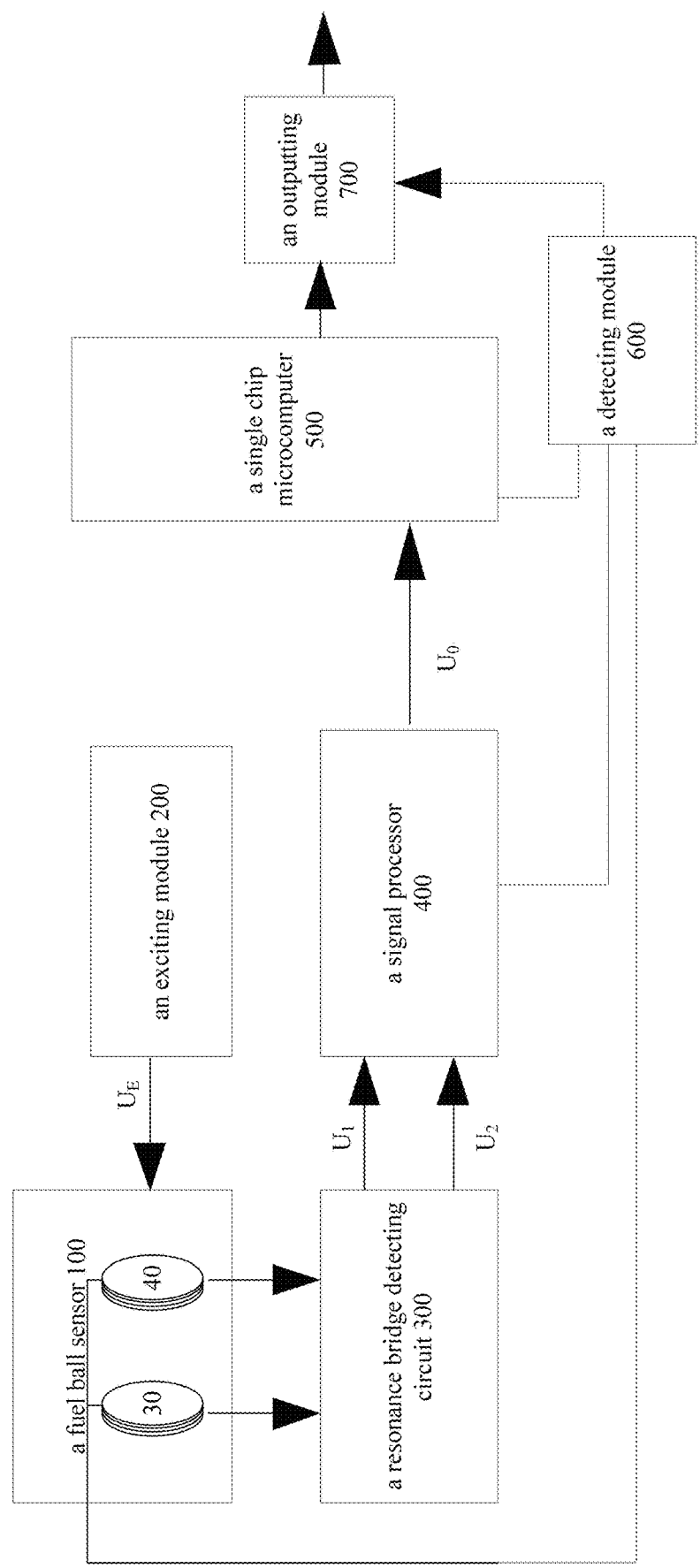
FIG. 8 is a schematic diagram showing a fuel ball detecting system with a self-diagnosis function according to an embodiment of the present disclosure.

As shown in FIG. 8, according to embodiments of the present disclosure, a fuel ball detecting system with a self-diagnosis function is provided, which includes: a fuel ball sensor 100, an exciting module 200, a resonance bridge detecting circuit 300, a signal processor 400, a single chip microcomputer 500, a self-diagnosis module 600 and an outputting module 700.

The fuel ball sensor 100 is disposed outside a pipeline and includes a first detecting coil 30 and a second detecting coil 40 winding around the pipeline and set upstream and downstream the pipeline respectively. The exciting module 20 is configured to generate a sinusoidal alternating current exciting signal to excite the first detecting coil 30 and the second detecting coil 40. The resonance bridge detecting circuit is configured to obtain a first voltage signal $U_1$ from the first detecting coil 30 and a second voltage signal $U_2$ from the second detecting coil 40. The signal processor 400 is connected with the resonance bridge detecting circuit 300 and is configured to process the first voltage signal $U_1$ and the second voltage signal $U_2$ by differential amplification, band pass filtering, phase sensitive detection and low pass filtering, so as to obtain a fuel ball waveform signal $U_0$. The single chip microcomputer 500 is connected with the signal processor 400 and is configured to determine whether the fuel ball passes the pipeline according to the $U_0$. The self-diagnosis module 600 is connected with the first detecting coil 30, the second detecting coil 40, the signal processor 400 and the single chip microcomputer 500 and is configured to detect whether the first detecting coil 30, the second detecting coil 40, the signal processor 400 and the single chip microcomputer 500 work normally. The outputting module 700 is connected with the single chip microcomputer 500 and the self-diagnosis module 600 respectively and is configured to output a result showing whether the fuel ball passes the pipeline, when the first detecting coil 30, the second detecting coil 40, the signal processor 400 and the single chip microcomputer 500 work normally. In addition, the outputting module 700 is further configured to output an alarm when the self-diagnosis output signal is a low level signal, which means that at least one of the first detecting coil 30, the second detecting coil 40, the signal processor 400 and the single chip microcomputer 500 work abnormally.

The fuel ball sensor 100, the resonance bridge detecting circuit 200, the exciting module 300 and the signal processor 400 in embodiments of the present disclosure have been described above, which are omitted here.

In an embodiment of the present disclosure, the single chip microcomputer 500 includes: a first determining module, a second determining module, a third determining module. Specifically, the first determining module is configured to process the fuel ball waveform signal $U_0$ by dual threshold comparison to generate adjacent pulses and to determine whether the adjacent pulses comprise a peak pulse $U_{P1}$ and a valley pulse $U_{P2}$; if yes, the first determining module determines the fuel ball waveform signal $U_0$ is complete; and if no, the first determining module determines the fuel ball waveform signal $U_0$ is incomplete. The second determining module is configured to determine whether a time difference between a falling edge of the peak pulse $U_{P1}$ and a rising edge of the valley pulse $U_{P2}$ of the fuel ball waveform signal $U_0$ adjacent to each other is less than a peak pulse width or a valley pulse width; if yes, the second determining module determines the fuel ball waveform signal $U_0$ is continuous; and if no, the second determining module determines the fuel ball waveform signal $U_0$ is discontinuous. The peak pulse width is determined by a peak amplitude threshold $U_{Th1}$ of the fuel ball waveform signal $U_0$ and the valley pulse width is determined by a valley amplitude threshold $U_{Th2}$ of the fuel ball waveform signal $U_0$, in which $U_{Th1}$=(a base value of $U_0$ without the fuel ball+a peak value of $U_0$ with the fuel ball)/2, $U_{Th2}$=(a base value of $U_0$ without the fuel ball+a valley value of $U_0$ with the fuel ball)/2, in which the base value of $U_0$ without the fuel ball is a preset value. The third determining module is configured to determine whether waveform widths of the peak pulse $U_{P1}$ and the valley pulse $U_{P2}$ of $U_0$ are similar to each other; if yes, the third determining module determines the fuel ball waveform signal $U_0$ is symmetrical; if no, the third determining module determines the fuel ball waveform signal $U_0$ is dissymmetrical. Furthermore, the single chip microcomputer 500 determines the fuel ball passes the pipeline when the fuel ball waveform signal $U_0$ is complete, continuous and symmetrical.

In an embodiment of the present disclosure, the self-diagnosis module 600 includes: a first detecting unit, a second detecting unit, a third detecting unit and an AND gate circuit. Specifically, the first detecting unit is configured to determine whether the first detecting coil 30 and the second detecting coil 40 work normally by detecting voltages across the first detecting coil 30 and the second detecting coil 40, and output a first high level signal, when the first detecting coil 30 and the second detecting coil 40 work normally. The second detecting unit is configured to determine whether the signal processor 400 works normally via a photocoupler disposed on a power source terminal of the signal processor 400, and output a second high level signal when the signal processor 400 works normally. The third detecting unit is configured to determine whether the single chip microcomputer works normally by detecting a square wave output from the single chip microcomputer, and output a third high level signal when the single chip microcomputer works normally. Furthermore, the AND gate circuit is configured to process the first high level signal, the second high level signal and the third high level signal by AND operation to get a self-diagnosis output signal, in which when the self-diagnosis output signal is a high level signal, the self-diagnosis module 600 determines that the first detecting coil 30, the second detecting coil 40, the signal processor 400 and the single chip microcomputer 500 work normally.

In order to achieve a better anti-interference capability, the detecting system has an isolated electromagnetic shielding structure to reduce radiated interference effects to the largest extent. Specifically, the signal processor 400 and the single chip microcomputer 500 may be disposed in an aluminium alloy melded and assembled case and inputs and outputs of signals and power source are realized via the aviation plug or the feed-through filter. Shielded cables are used to connect the first detecting coil 30, the second detecting coil 40, the resonance bridge detecting circuit 200 and the signal processor 300, and shielding layers of the shielded cables conduct well with the housing of the fuel ball sensor 100 and the aluminium alloy case of the signal processor 400. Power source wires adopt a varistor, a Ni—Zn magnet ring, a Mn—Zn common mode choke and a power source filter to remove conduction disturbance of a high voltage, a high frequency common mode, a low frequency common mode and a differential mode. Signal wires use the Ni—Zn magnet ring and the Mn—Zn common mode choke to remove conduction disturbance of the high frequency common mode and the low frequency common mode.

According to embodiments of the present disclosure, the fuel ball detecting system with a self-diagnosis function has at least following advantages: semi-ring coils fitted with each other are used as the outboard sensor, which makes the structure of the sensor simple; it's not necessary to destroy the pipeline during installation and maintenance, thus ensuring the completeness and gas tightness of the pipeline under a high pressure and reducing the radiation pollution; by providing a reasonable exciting signal and processing the fuel ball waveform signal $U_O$, a good signal to noise ratio can be obtained and the system gain can be reduced; the first and the second detecting coils are designed with an electromagnetic compatibility, which improves the anti-interference capability; a self-diagnosis function is added and when a fault occurs in at least one of the first and the second detecting coils, the signal processor and the single chip microcomputer, an alarm can be generated for the fault to be removed in time, which avoids the counting loss and improves the reliability of a fuel ball counting result.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A fuel ball detecting method with a self-diagnosis function, comprising:

exciting a first detecting coil and a second detecting coil of a fuel ball sensor disposed outside a pipeline by a sinusoidal alternating current, wherein the first detecting coil and the second detecting coil wind around the pipeline and are set upstream and downstream of a given point on the pipeline respectively;

obtaining a first voltage signal $U_1$ from the first detecting coil and a second voltage signal $U_2$ from the second detecting coil;

processing the first voltage signal $U_1$ and the second voltage signal $U_2$ by differential amplification, band pass filtering, phase sensitive detection and low pass filtering by a signal processor so as to obtain a fuel ball waveform signal $U_O$;

determining whether the fuel ball passes the pipeline according to $U_O$ by a single chip microcomputer;

determining whether the first detecting coil, the second detecting coil, the signal processor and the single chip microcomputer work normally; and outputting a result showing whether the fuel ball passes the pipeline, when the first detecting coil, the second detecting coil, the signal processor and the single chip microcomputer work normally, wherein determining whether the first detecting coil, the second detecting coil, the signal processor and the single chip microcomputer work normally comprises:

determining whether the first detecting coil and the second detecting coil work normally by detecting voltages across the first detecting coil and the second detecting coil, and outputting a first high level signal, when the first detecting coil and the second detecting coil work normally;

determining whether the signal processor works normally via a photocoupler disposed on a power source terminal of the signal processor, and outputting a second high level signal when the signal processor works normally;

determining whether the single chip microcomputer works normally by detecting a square wave output from the single chip microcomputer, and outputting a third high level signal when the single chip microcomputer works normally;

processing the first high level signal, the second high level signal and the third high level signal by AND operation to get a self-diagnosis output signal; and determining that the first detecting coil, the second detecting coil, the signal processor and the single chip microcomputer work normally when the self-diagnosis output signal is a high level signal.

2. The detecting method according to claim 1, further comprising outputting an alarm when the self-diagnosis output signal is a low level signal, which means that at least one of the first detecting coil, the second detecting coil, the signal processor and the single chip microcomputer work abnormally.

3. The detecting method according to claim 1, wherein the fuel ball sensor comprises:

a housing;

a pair of semi-ring frames disposed over the pipeline fitted with each other;

an aviation plug or a feed-through filter connected with an output terminal of the first detecting coil and the second detecting coil; and an electromagnetic sealing gasket;

wherein the first detecting coil and the second detecting coil respectively comprise a pair of semi-ring coils winding around the pair of semi-ring frames, and the electromagnetic sealing gasket fills in a gap between the semi-ring coils and contacts with the housing.

4. The detecting method according to claim 1, wherein determining whether the fuel ball passes the pipeline according to $U_0$ comprises:

determining whether the fuel ball waveform signal $U_0$ is complete;

determining whether the fuel ball waveform signal $U_0$ is continuous;

determining whether the fuel ball waveform signal $U_0$ is symmetrical; and determining the fuel ball passes the pipeline when the fuel ball waveform signal $U_0$ is complete, continuous and symmetrical.

5. The detecting method according to claim 4, wherein detecting whether the fuel ball waveform signal $U_0$ is complete comprises:

processing the fuel ball waveform signal $U_0$ by dual threshold comparison to generate adjacent pulses, determining whether the adjacent pulses comprise a peak pulse $U_{P1}$ and a valley pulse $U_{P2}$;

if yes, determining the fuel ball waveform signal $U_0$ is complete; and if no, determining the fuel ball waveform signal $U_0$ is incomplete.

6. The detecting method according to claim 5, wherein determining whether the fuel ball waveform signal $U_0$ is continuous comprises:

determining whether a time difference between a falling edge of the peak pulse $U_{P1}$ and a rising edge of the valley pulse $U_{P2}$ of the fuel ball waveform signal $U_0$ adjacent to each other is less than a peak pulse width or a valley pulse width;

if yes, determining the fuel ball waveform signal $U_0$ is continuous; and if no, determining the fuel ball waveform signal $U_0$ is discontinuous, wherein the peak pulse width is determined by a peak amplitude threshold $U_{Th1}$ of the fuel ball waveform signal $U_0$ and the valley pulse width is determined by a valley amplitude threshold $U_{Th2}$ of the fuel ball waveform signal $U_0$, in which $U_{Th1}$=(a base value of $U_0$ without the fuel ball+a peak value of $U_0$ with the fuel ball)/2, $U_{Th2}$=(the base value of $U_0$ without the fuel ball+a valley value of $U_0$ with the fuel ball)/2, in which the base value of $U_0$ without the fuel ball is a preset value.

7. The detecting method according to claim 5, wherein determining whether the fuel ball waveform signal $U_0$ is symmetrical comprises:

determining whether waveform widths of the peak pulse $U_{P1}$ and the valley pulse $U_{P2}$ of $U_0$ are similar to each other;

if yes, determining the fuel ball waveform signal $U_0$ is symmetrical; and if no, determining the fuel ball waveform signal $U_0$ is dissymmetrical.

8. A fuel ball detecting system with a self-diagnosis function, comprising:

a fuel ball sensor disposed outside a pipeline and comprising a first detecting coil and a second detecting coil winding around the pipeline and set upstream and downstream of a given point on the pipeline respectively;

an exciting module configured to generate a sinusoidal alternating current exciting signal to excite the first detecting coil and the second detecting coil;

a resonance bridge detecting circuit configured to obtain a first voltage signal $U_1$ from the first detecting coil and a second voltage signal $U_2$ from the second detecting coil;

a signal processor connected with the resonance bridge detecting circuit and configured to process the first voltage signal $U_1$ and the second voltage signal $U_2$ by differential amplification, band pass filtering, phase sensitive detection and low pass filtering, so as to obtain a fuel ball waveform signal $U_0$;

a single chip microcomputer connected with the signal processor and configured to determine whether the fuel ball passes the pipeline according to $U_0$, a self-diagnosis module connected with the first detecting coil, the second detecting coil, the signal processor and the single chip microcomputer and configured to detect whether first detecting coil, the second detecting coil, the signal processor and the single chip microcomputer work normally; and an outputting module connected with the single chip microcomputer and the self-diagnosis module respectively and configured to output a result showing whether the fuel ball passes the pipeline, when the first detecting coil, the second detecting coil, the signal processor and the single chip microcomputer work normally, wherein the self-diagnosis module comprises:

a first detecting unit configured to determine whether the first detecting coil and the second detecting coil work normally by detecting voltages across the first detecting coil and the second detecting coil, and output a first high level signal, when the first detecting coil and the second detecting coil work normally;

a second detecting unit configured to determine whether the signal processor works normally via a photocoupler disposed on a power source terminal of the signal processor, and output a second high level signal when the signal processor works normally;

a third detecting unit configured to determine whether the single chip microcomputer works normally by detecting a square wave output from the single chip microcomputer, and output a third high level signal when the single chip microcomputer works normally; and an AND gate circuit configured to process the first high level signal, the second high level signal and the third high level signal by AND operation to get a self-diagnosis output signal, wherein the self-diagnosis module is further configured to determine that the first detecting coil, the second detecting coil, the signal processor and the single chip microcomputer work normally, when the self-diagnosis output signal is a high level signal.

9. The detecting system according to claim 8, wherein the outputting module is further configured to output an alarm when the self-diagnosis output signal is a low level signal, which means that at least one of the first detecting coil, the second detecting coil, the signal processor and the single chip microcomputer work abnormally.

10. The detecting system according to claim 8, wherein the fuel ball sensor comprises:

a housing;

a pair of semi-ring frames disposed over the pipeline fitted with each other;

an aviation plug or a feed-through filter connected with an output terminal of the first detecting coil and the second detecting coil; and an electromagnetic sealing gasket;

wherein the first detecting coil and the second detecting coil respectively comprise a pair of semi-ring coils winding around the pair of semi-ring frames, and the electromagnetic sealing gasket fills in a gap between the semi-ring coils and contacts with the housing.

11. The detecting system according to claim 8, wherein the single chip microcomputer comprises:
   a first determining module configured to determine whether the fuel ball waveform signal $U_0$ is complete;
   a second determining module configured to determine whether the fuel ball waveform signal $U_0$ is continuous;
   a third determining module configured to determine whether the fuel ball waveform signal $U_0$ is symmetrical.

12. The detecting system according to claim 11, wherein the first determining module is configured to:
   process the fuel ball waveform signal $U_0$ by dual threshold comparison to generate adjacent pulses,
   determine whether the adjacent pulses comprise a peak pulse $U_{P1}$ and a valley pulse $U_{P2}$;
   if yes, determine the fuel ball waveform signal $U_0$ is complete; and
   if no, determine the fuel ball waveform signal $U_0$ is incomplete.

13. The detecting system according to claim 12, wherein the second determining module is configured to:
   determine whether a time difference between a falling edge of the peak pulse $U_{P1}$ and a rising edge of the valley pulse $U_{P2}$ of the fuel ball waveform signal $U_0$ adjacent to each other is less than a peak pulse width or a valley pulse width;
   if yes, determine the fuel ball waveform signal $U_0$ is continuous; and
   if no, determine the fuel ball waveform signal $U_0$ is discontinuous,
   wherein the peak pulse width is determined by a peak amplitude threshold $U_{Th1}$ of the fuel ball waveform signal $U_0$ and the valley pulse width is determined by a valley amplitude threshold $U_{Th2}$ of the fuel ball waveform signal $U_0$, in which $U_{Th1}$=(a base value of $U_0$ without the fuel ball+a peak value of $U_0$ with the fuel ball)/2, $U_{Th2}$=(the base value of $U_0$ without the fuel ball+a valley value of $U_0$ with the fuel ball)/2, in which the base value of $U_0$ without the fuel ball is a preset value.

14. The detecting system according to claim 12, wherein the third determining module is configured to:
   determine whether waveform widths of the peak pulse $U_{P1}$ and the valley pulse $U_{P2}$ of $U_0$ are similar to each other;
   if yes, determine the fuel ball waveform signal $U_0$ is symmetrical; and
   if no, determine the fuel ball waveform signal $U_0$ is dissymmetrical.

15. The detecting system according to claim 8, wherein the resonance bridge detecting circuit comprises:
   a first bridge arm consisting of a first resistor and having a terminal connected with an output terminal of the exciting module to receive the exciting signal;
   a second bridge arm consisting of a second resistor and having a terminal connected with the output terminal of the exciting module to receive the exciting signal;
   a third bridge arm consisting of the first detecting coil, a first capacitor and a potentiometer connected in parallel with each other, wherein a first terminal of the third bridge arm is grounded and a second terminal of the third bridge arm is configured to output the first voltage signal $U_1$;
   a fourth bridge arm consisting of the second detecting coil, a second capacitor and a third resistor connected in parallel with each other, wherein a first terminal of the fourth bridge is grounded and a second terminal of the fourth bridge arm is configured to output the second voltage signal $U_2$.

16. The detecting system according to claim 8, wherein the detecting system has an isolated electromagnetic shielding structure.

* * * * *